United States Patent Office 3,333,398
Patented Aug. 1, 1967

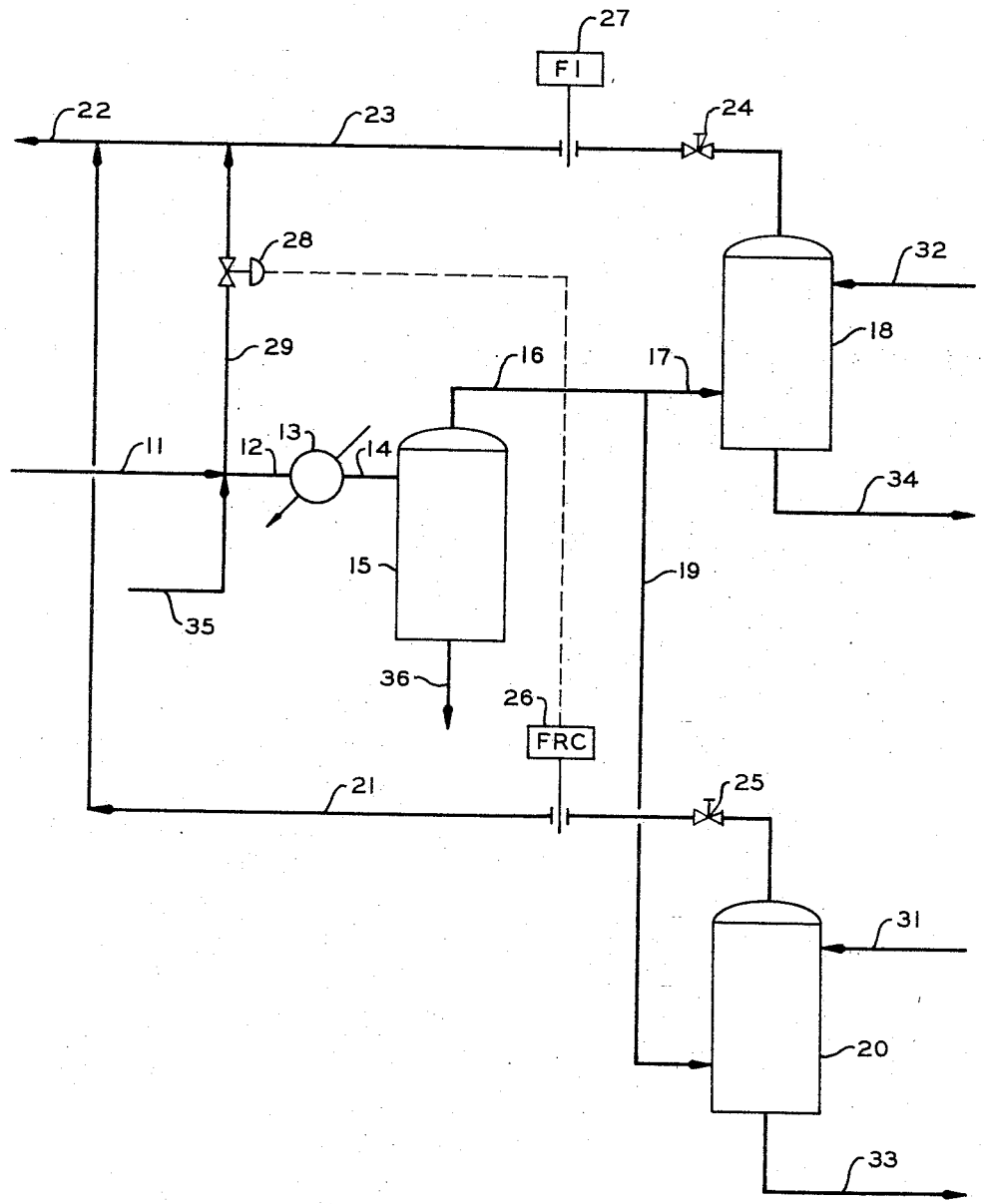

3,333,398
ABSORPTION FLOW CONTROL
Julius E. Schneider, Bartlesville, Okla., assignor to Phillips Petroleum Company, a corporation of Delaware
Filed June 12, 1964, Ser. No. 374,787
2 Claims. (Cl. 55—18)

This invention relates to flow control. In one aspect, the invention relates to apparatus and method for controlling flow through an absorber. In another aspect, the invention relates to apparatus and method for processing natural gas.

Absorption plants often are used to remove natural gasoline from natural gas. Frequently, to obtain the desired and necessary capacity for the amount of gas processed, and still to operate in an economical and efficient manner, it is necessary to use two or more separate absorber units. When doing so, and also when using single absorber units, it is desirable to prevent flooding of the absorber column by by-passing gas when the flow exceeds that which the column is capable of handling. When more than one absorber unit is used, it is desirable to prevent such flooding and also to maintain the proper balance of flow through the separate units.

An object of the invention is to control fluid flow.

Another object of the invention is to control the flow of gas through an absorber system, to prevent flooding of the absorber unit.

Another object of the invention is to maintain proper balance of flow between two or more separate absorbers and to prevent over-loading the absorbers with a high rate of flow.

Another object of the invention is to process natural gas.

Other aspects, objects and the advantages of the invention are apparent in the written description, the drawing, and the claims.

According to this invention, gas flow is by-passed around an absorber when the volume of flow through the absorber becomes higher than a predetermined desirable amount. Further according to the invention, the proper balance of flow through two or more absorbers is adjusted by adjusting flow restricting means in the gaseous effluent conduits and overloading is prevented by measuring the flow from one of the absorbers and controlling a by-pass from the main stream feeding both absorbers to open a valve and to by-pass the absorbers when the flow becomes excessive. Further according to the invention, there is provided apparatus for preventing over-loading of an absorber by opening a by-pass around the absorber when the volume of flow through the absorber is excessive. Further according to the invention, there is provided apparatus to regulate the flow through two or more absorbers by providing valve means in the outlet from the absorbers and preventing over loading by controlling the by-pass valve in response to the volume of flow through one of the absorbers.

In the drawing, the rich gas enters through gas inlet conduit 11, passes through conduit 12, heat exchanger 13, conduit 14 and scrubber 15 into conduit 16. The gas flowing through conduit 16 is divided, a portion passing through conduit 17 to absorber 18 and the remainder passing through conduit 19 to absorber 20. Dry gas leaves absorber 20 through conduit 21 and flows outwardly through conduit 22. Dry gas from absorber 18 flows through conduit 23 which also joins conduit 22. The flow in conduit 23 is controlled by an adjustable butterfly valve 24, while flow in conduit 21 is controlled by an adjustable butterfly valve 25. A flow recorder-controller 26 is provided in conduit 21 and a flow indicator 27 in conduit 23 as illustrated. By proper adjustment of the butterfly valves 24 and 25, while observing the flow on controller 26 and indicator 27, the ratio of the flow from the separate absorbers can be adjusted to the desired figure. Lean oil is supplied through conduits 31 and 32 and rich oil is removed through conduits 33 and 34. Glycol is added through conduit 35 to prevent the formation of hydrates and removed through conduit 36.

Flow recorder controller 26 controls motor valve 28 in by-pass conduit 29 to prevent excessive flow through the absorbers.

Although conduit 21 and conduit 23 are shown discharging through the same common conduit 22, it is possible to operate successfully with separate gaseous effluent from the separate absorbers if desired. By-pass conduit 29 can connect with either of the conduits 21 or 23 or can be a separate discharge of gas. That is to say, conduit 29, although called a by-pass, can be an entirely separate flow conduit if desired, the function being to prevent excessive flow through and accompanying danger of flooding of the absorbers.

Although the control means in conduits 21 and 23 for adjusting the ratio of flow therethrough, are shown as butterfly valves 24 and 25, other flow control means can be substituted where suitable. The gas treating system illustrated in the drawing described above is, of course, greatly simplified for purposes of illustration. In actual operation, a plant contains many other items of associated equipment including, for example, pumps, other controllers, valves, etc., which one skilled in the art can readily supply.

*Example*

A plant for the removal of gasoline and water from natural gas is constructed as shown in the drawing. Absorber 20 is 8 feet in diameter and has 25 trays. Absorber 18 is 6 feet in diameter and has 25 trays. Both absorbers operate at 1,000 p.s.i.g. and −10° F. Absorber 20 will process 180,000,000 standard cubic feet of natural gas per day, while absorber 18 will handle 100,000,000 standard cubic feet per day, without flooding. At a rate of 180,000,000 cubic feet through absorber 20, 625,000 gallons of lean oil are supplied through conduit 32 and 850,000 gallons of rich oil are removed through conduit 34. In absorber 18, 350,000 gallons per day of lean oil are supplied through conduit 31 and 470,000 gallons per day of rich oil are removed through conduit 33. 10.9 gallons per minute of glycol are supplied through conduit 35 to prevent the formation of hydrates as the stream is cooled prior to absorption. The glycol is removed through conduit 36.

Flow recorder controller 26 is set to maintain valve 28 closed up to the rate of 180,000,000 cubic feet per day, while above this rate, valve 28 is opened sufficiently to maintain this flow, and thus to maintain the total rate of flow through conduit 11 to 280,000,000 cubic feet per day.

Reasonable variation and modification are possible within the scope of this invention which sets forth method and apparatus for controlling flow through an absorber and processing natural gas.

I claim:
1. A method for controlling the flow of gas to two liquid absorbers, which comprises the steps of:
   dividing a flowing stream of gas and feeding a first portion of said gas to a first of said liquid absorbers and a second portion of said gas to a second of said liquid absorbers;
   adjusting the separate gaseous effluent streams from said liquid absorbers to adjust the flow through said absorbers in a desired ratio;
   recombining said gaseous effluent streams;
   continuously measuring the volume of flow in one of said gaseous effluent streams and producing a control signal responsive thereto; and utilizing said signal to open a by-pass from said flowing stream of gas to said combined effluent streams to open said valve when said rate of flow exceeds the desired maximum.

2. Apparatus for processing natural gas comprising:
a gas inlet conduit;
a first liquid absorber;
a second liquid absorber;
a first branch conduit of said inlet conduit, communicating with said first liquid absorber;
a second branch conduit of said inlet conduit, communicating with said second liquid absorber;
a first liquid dry gas effluent conduit from said first absorber;
a second liquid dry gas effluent conduit from said second absorber, said first and second dry gas effluent conduits being connected to a single master effluent conduit;
first flow adjusting means in said first effluent conduit;
second flow adjusting means in said second effluent conduit;
a by-pass conduit connecting said gas inlet conduit with said master effluent conduit;
a motor valve in said by-pass conduit; and
flow control means in one of said first and second effluent conduits, said flow control means being operatively connected with said motor valve to open said motor valve when the volume of flow in said conduit exceeds a predetermined value.

References Cited
UNITED STATES PATENTS

| | | | |
|---|---|---|---|
| 2,665,769 | 1/1954 | Walker et al. | 55—21 |
| 2,995,203 | 8/1961 | Maurer | 55—21 |
| 3,124,438 | 3/1964 | Lavery | 55—163 X |
| 3,205,639 | 9/1965 | Johnson et al. | 55—21 |
| 3,257,772 | 6/1966 | Maddox et al. | 55—62 X |

REUBEN FRIEDMAN, *Primary Examiner.*

J. ADEE, *Assistant Examiner.*